United States Patent
Nguyen et al.

[11] Patent Number: 5,600,548
[45] Date of Patent: Feb. 4, 1997

[54] DC CONTENT CONTROL FOR AN INVERTER

[75] Inventors: Vietson Nguyen; P. John Dhyanchand, both of Rockford, Ill.

[73] Assignee: Sundstrand Corporation, Rockford, Ill.

[21] Appl. No.: 289,485

[22] Filed: Aug. 11, 1994

[51] Int. Cl.⁶ ........................................... H02M 1/12
[52] U.S. Cl. ...................................................... 363/41
[58] Field of Search ........................... 363/40, 41, 43, 363/95, 97, 131

[56] References Cited

U.S. PATENT DOCUMENTS

| | | | |
|---|---|---|---|
| 4,099,109 | 7/1978 | Abbondanti | 318/227 |
| 4,354,223 | 10/1982 | Turnbull | 363/124 |
| 4,513,362 | 4/1985 | Aizawa | 363/41 |
| 4,633,382 | 12/1986 | Upadhyay et al. | 363/132 |
| 4,654,773 | 3/1987 | Ito et al. | 363/41 |
| 4,727,468 | 2/1988 | Maekawa | 363/41 |
| 4,772,996 | 9/1988 | Hanei et al. | 363/41 |
| 4,807,103 | 1/1989 | Uesugi | 363/41 |
| 4,875,149 | 10/1989 | Rozman et al. | 363/41 |
| 4,882,120 | 11/1989 | Roe et al. | 363/98 |
| 4,954,726 | 9/1990 | Lipman et al. | 307/46 |
| 5,283,726 | 2/1994 | Wilkerson | 363/41 |
| 5,450,306 | 9/1995 | Garces et al. | 363/41 |

FOREIGN PATENT DOCUMENTS

| | | |
|---|---|---|
| 2323826 | 11/1974 | Germany . |
| 55-97186 | 7/1980 | Japan . |
| 57-9267 | 1/1982 | Japan . |
| 57-55775 | 4/1982 | Japan . |
| 2189950 | 11/1987 | United Kingdom . |

OTHER PUBLICATIONS

An article entitled "A Digital Modulator Circuit for PWM Inverters" written by A. Abbondanti, Industry Application & Society IEE–IAS 1978, pp. 493–501.

*Primary Examiner*—Matthew V. Nguyen
*Attorney, Agent, or Firm*—Jeffery J. Makeever

[57] ABSTRACT

A control for an inverter having a switch which is operated in accordance with a PWM waveform having spaced rising and falling edges includes circuitry which detects the magnitude and polarity of a DC component in the AC output power produced by the inverter and an adder/subtractor which adjusts at least one of a rising and falling edge of the waveform to reduce the magnitude of the DC component.

15 Claims, 4 Drawing Sheets

5,600,548

DC CONTENT CONTROL FOR AN INVERTER

TECHNICAL FIELD

The present invention relates generally to inverter controls, and more particularly to a control which controls DC content in the output of an inverter.

BACKGROUND ART

Power inverters have been used in variable-speed, constant-frequency power generating systems to convert DC power on a DC link into AC power for energizing one or more AC loads. Typically, such inverters include switches, such as transistors, which are operated by a control in a pulse-width modulated (PWM) mode to produce a PWM waveform comprising a series of pulses and notches. The waveform is converted into a sinusoidal output waveform by a filter which is coupled to the inverter output.

Ideally, the control should operate the inverter switches so that no DC power is produced in the output. However, operating conditions may cause DC content to be produced in the output of the inverter. This DC content can lead to undesirable consequences when the loads supplied by the inverter cannot tolerate same.

Roc et al. U.S. Pat. No. 4,882,120, assigned in the assignee of the instant application, discloses a DC content control for an inverter which detects the magnitude of a DC component in the inverter AC output power and adjusts the time of selected rising and falling edges of switch control waveforms stored in a memory to reduce the magnitude of the DC component. The control utilizes a finite state machine together with timers, logic gates and flip-flops to adjust the rising and/or falling edges.

Sato U.S. Pat. No. 4,729,082 discloses a control for a power converter which converts between AC and DC power in a bidirectional manner. In order to eliminate the DC component of current on the AC side of the power converter, the control operates the inverter to produce a DC voltage on the AC side which opposes the direct current component. The DC voltage is produced in one embodiment by shifting a half-cycle of the AC output waveform by a phase displacement which causes a DC component to be produced in the phase output. There is no clear description in this patent, however, as to how or by what means this is accomplished.

SUMMARY OF THE INVENTION

In accordance with the present invention, a control for an inverter controls DC content in the inverter output in a simple and effective manner.

More particularly, according to one aspect of the present invention, a control for an inverter having a switch which is operated in accordance with a waveform having spaced rising and falling edges wherein the inverter produces AC output power includes means for detecting the magnitude and polarity of a DC component in the AC output power. An adder/subtractor is responsive to the detecting means for adjusting at least one of a rising and falling edge of the waveform to reduce the magnitude of the DC component.

In accordance with a preferred embodiment, the detecting means comprises a summer which sums a signal representing the DC component with a reference to derive an error signal and an error amplifier coupled to the summer which amplifies the error signal.

Still further in accordance with the preferred embodiment, the adder/subtractor includes add/subtract inputs and a control input and the detecting means further includes means for separating the amplified error signal into a magnitude signal, which is coupled to the add/subtract inputs, and a sign signal, which is coupled to the control input.

Still further in accordance with the preferred embodiment, the add/subtract inputs further receive a series of digital words developed by a memory wherein each digital word represents intervals between rising and falling edges of a stored PWM waveform.

In accordance with the further aspect of the present invention, a control for a pulsewidth modulated (PWM) inverter having a pair of switches which are alternately operated in accordance with a PWM control waveform having rising and falling edges to develop AC output power includes a memory having a series of digital words stored therein representing intervals between rising and falling edges of a stored PWM waveform and means for detecting the magnitude and polarity of a DC component in the AC output power. An adder/subtractor is provided having a first set of add/subtract inputs coupled to the memory, a second set of add/subtract inputs which receive a signal representing the magnitude of the DC component, a control input which receives a signal representing the polarity of the DC component and an output at which a series of modified interval words are developed. A counter is provided which develops a counter output as well as a comparator which compares each modified interval word against the counter output to produce the PWM control waveform. A rising or falling edge of the PWM control waveform is adjusted by the adder/subtractor relative to a corresponding rising or falling edge of the stored PWM waveform to reduce the magnitude of the DC component.

In accordance with yet another aspect of the present invention, a control for a PWM inverter having a pair of switches which are alternately operated in accordance with a PWM control waveform having rising and falling edges to develop AC output power includes a memory having a plurality of series of digital words stored therein wherein each series represents intervals between rising and falling edges of the stored PWM waveform and means for detecting the magnitude and polarity of a DC component in AC output power. An adder/subtractor is provided having a first set of add/subtract inputs coupled to the memory, a second set of add/subtract inputs which receive a signal representing the magnitude of the DC component, a control input which receives a signal representing the polarity of the DC component and an output at which a series of modified interval words are developed. A counter develops a counter output and a comparator compares each modified interval word against the counter output to produce the PWM control waveform. A rising or falling edge of the PWM control waveform is adjusted by the adder/subtractor relative to a corresponding rising or falling edge of the stored PWM waveform to reduce the magnitude of the DC component.

In accordance with yet another aspect of the present invention, a method of controlling an inverter having a switch which is operated in accordance with a waveform having spaced rising and falling edges wherein the inverter produces AC output power includes the steps of detecting the magnitude and polarity of a DC component in the AC output power and providing an adder/subtractor responsive to the detecting means for adjusting at least one of a rising and falling edge of a waveform to reduce the magnitude of the DC component.

According to a still further aspect of the present invention, a method of controlling a PWM inverter having a pair of switches which are alternately operated in accordance with a PWM control waveform having rising and falling edges to develop AC output power includes the steps of providing a memory having a plurality of series of digital words stored therein wherein each series represents intervals between rising and falling edges of the stored PWM waveform and detecting the magnitude and polarity of a DC component in the AC output power. An adder/subtractor is provided having a first set of add/subtract inputs coupled to the memory, a second set of add/subtract inputs which receive a signal representing the magnitude of the DC component, a control input which receives a signal representing the polarity of the DC component and an output at which a series of modified interval words are developed. A counter is also provided which develops a counter output and each modified interval word is sequentially compared against the counter output to produce the PWM control waveform. A rising or falling edge of the PWM control waveform is adjusted by the adder/subtractor relative to a corresponding rising or falling edge of the stored PWM waveform to reduce the magnitude of the DC component.

The manner in which the PWM waveform is needed in the memory permits the DC content control to be implemented in a simple fashion with a minimum number of components.

DESCRIPTION OF THE PREFERRED EMBODIMENT

Figure 1:
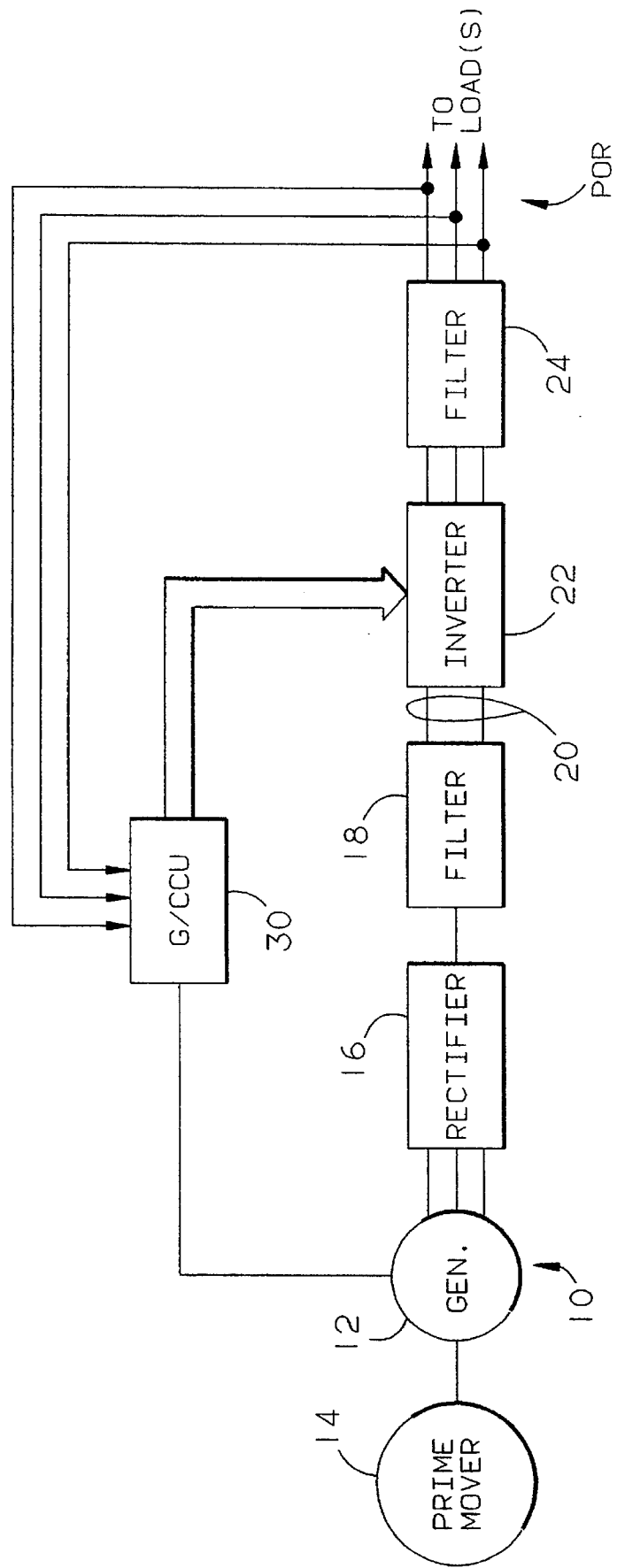
FIG. 1 is a block diagram of a VSCF system incorporating the control of the present invention.

Referring now to FIG. 1, a variable-speed, constant-frequency (VSCF) system 10 is illustrated. The VSCF system 10 includes a brushless, synchronous generator 12 driven by a variable-speed prime mover 14 which may be, for example, a jet engine. The generator develops a polyphase, variable frequency AC output which is converted into DC power by a rectifier 16 and a filter 18. The resulting DC power is provided over a DC link 20 to an inverter 22 which converts the DC power into constant-frequency AC power. This AC power is filtered by an optional filter 24 and is provided to one or more AC loads.

Figure 2:
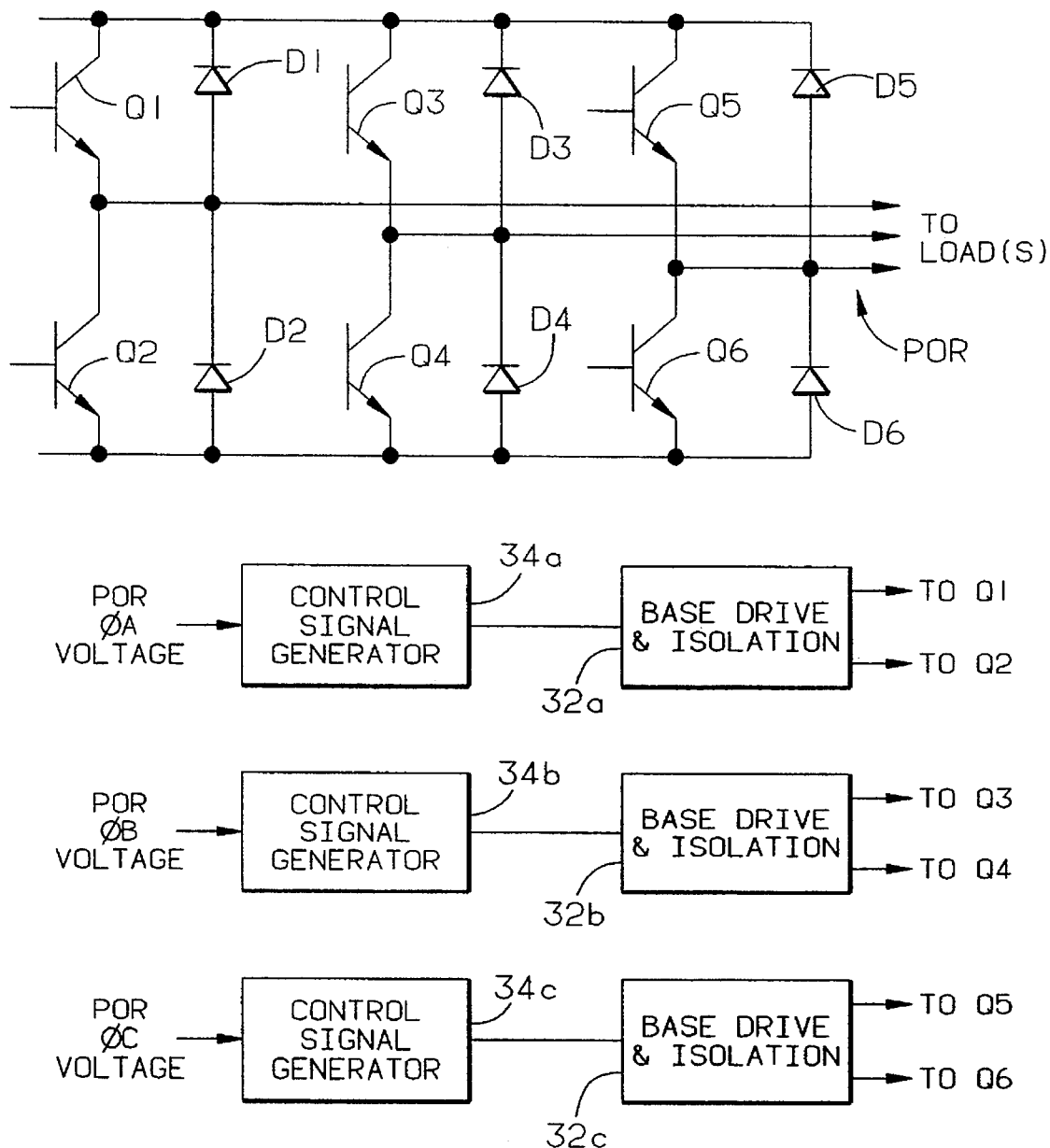
FIG. 2 is a combined schematic and block diagram of the control of the present invention in conjunction with a simplified representation of the inverter shown in FIG. 1.

The inverter 22 includes switches Q1–Q6, shown in FIG. 2, which are controlled by a generator/converter control unit or G/CCU 30. The G/CCU 30 also controls the excitation of the brushless generator 12 in accordance with a parameter of the output power developed at a point of regulation (POR). This latter function of the G/CCU 30 is not necessary to an understanding of the invention and hence will not be described in greater detail.

Referring specifically to FIG. 2, the switches Q1–Q6 of the inverter 22 are connected in pairs in a conventional three-phase bridge configuration together with associated flyback diodes D1–D6. The switches are controlled by base drive signals developed by base drive and isolation circuits 32a–32c. Each base drive and isolation circuit 32a, 32b or 32c receives a control signal MA, MB or MC, respectively, developed by a control signal generator 34a–34c, respectively. Each control signal generator 34a–34c is in turn responsive to a parameter of the power at the POR, for example, phase voltage.

The inverter topology illustrated in FIG. 2 is referred to as a rail-to-rail topology inasmuch as the switches of each pair are alternately operated so that each phase output is alternately connected to the upper and lower rails. This inverter may be replaced by an inverter of the rail-to-neutral type (sometimes referred to as a "neutral point clamped" inverter) in which an additional switch is connected between each phase output and a neutral voltage. During a positive half-cycle of each phase output, the upper rail switch Q1 or Q3 or Q5 is operated alternately with the corresponding neutral switch while the remaining switch of the pair Q2 or Q4 or Q6 is maintained off. During the negative half-cycle of each phase output, the upper rail switches Q1, Q3 and Q5 are maintained in the off condition while the switches Q2, Q4 or Q6 are operated alternately with the associated neutral switches. The phase outputs thus change between the voltage on one of the rails of the DC link 20 and the neutral voltage.

Figure 3:
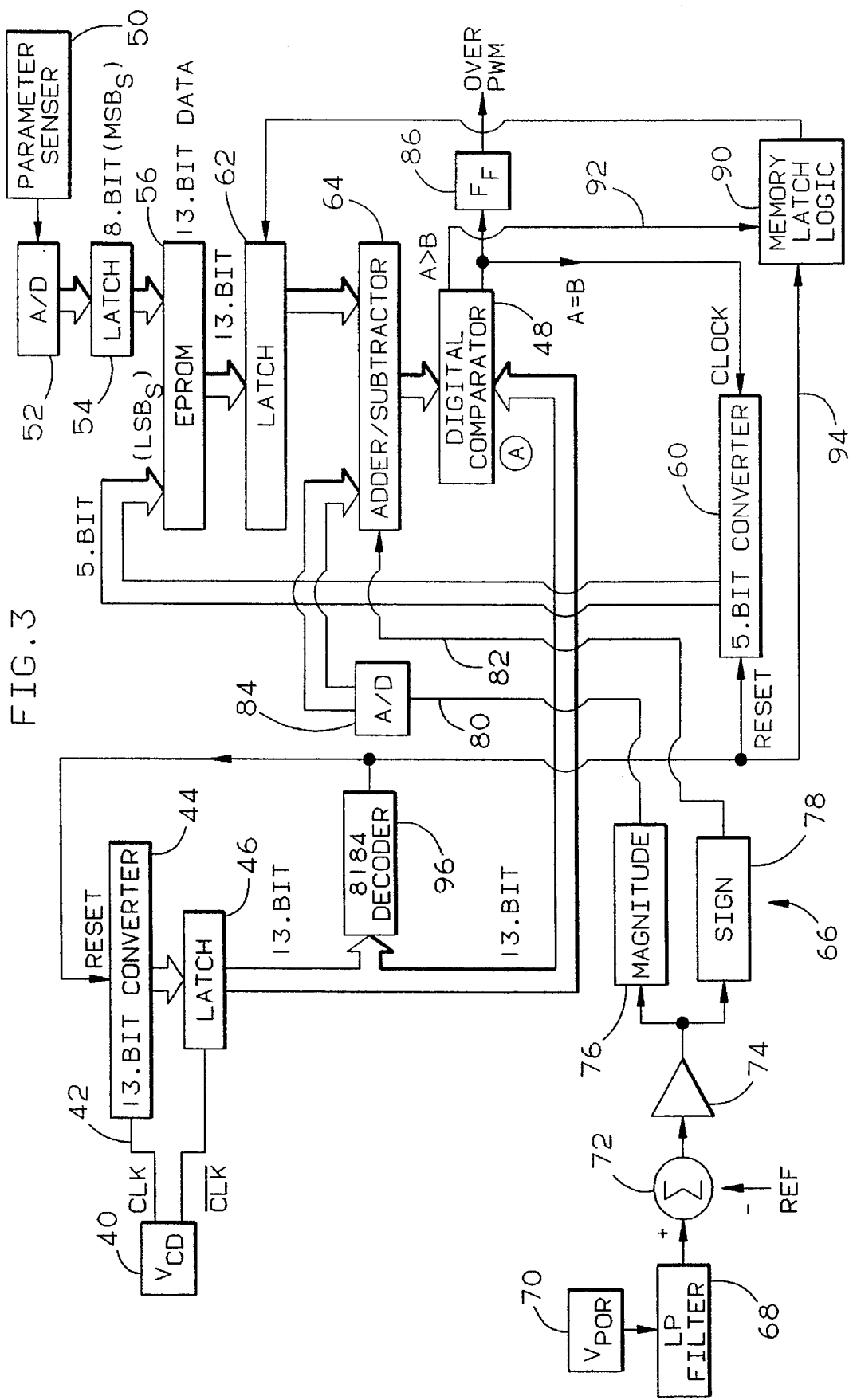
FIG. 3 is a block diagram of one of the control signal generators illustrated in block diagram form in FIG. 2.

FIG. 3 illustrates one of the control signal generators 34a–34c in greater detail. While each of the control signal generators 34a–34c may include the components shown in FIG. 3, it should be noted that several of the components may instead be shared among the control signal generators. In fact, with the addition of suitable multiplexing and demultiplexing circuits, all of the control signal generators 34a–34c might be implemented by the components of FIG. 3 alone.

A voltage controlled oscillator (VCO) 40 develops a series of clock signals on a line 42. The clock signals are provided to a 13-bit counter 44 which is in turn coupled to a latch 46. The latch 46 is controlled by an inverted clock signal from the VCO 40 and provides a latched counter output to a first set of inputs of a digital comparator 48.

A parameter sensor 50 detects a parameter of the AC power appearing at the POR. In the preferred embodiment, the magnitude of one of the phase output voltages of the inverter is sensed by the sensor 50, although one or more additional or different parameters may alternatively be sensed. For example, all three phase output voltages may be sensed and averaged, and/or one or more phase output currents might be detected and signals representative thereof combined with the sensed output voltages. In any event, a signal representing the sensed parameter(s) is converted to a digital signal by an analog-to-digital converter 52 and the resulting 13-bit digital signal is latched by a latch 54 and provided to a set of high order address inputs of a memory 56. The memory 56 may be implemented by an EPROM or any other memory element. The memory 56 stores a plurality of series of digital words wherein each series represents the durations or time intervals between rising and falling edges of a stored PWM waveform. The digital word provided by the latch 54 to the high order address inputs of the memory 56 selects a portion of the memory 56 in which one series of digital interval words is stored. As noted in greater detail hereinafter, a counter 60 develops a series of five-bit digital words or counter outputs which are supplied to low order address inputs of the memory 56 and which sequentially cause the interval words of the selected series to be provided at the output of the memory 56. The counter 60 accumulates pulses developed at the output of the comparator 48.

A latch 62 latches each 13-bit interval word retrieved from the memory 56 and provides the latched word to a first set of add/subtract inputs of an adder/subtractor 64. In the preferred embodiment, the adder/subtractor is manufactured and sold by Texas Instruments under IC number SN74LS385. A second set of add/subtract inputs receive a digital word developed by a detecting circuit 66 representing the magnitude of a DC component in the AC output power produced by the inverter 22. The circuit 66 includes a low pass filter 68 which receives a signal representing the voltage of one of the phase outputs developed at the POR as detected by the sensor 50 or by a voltage sensor 70 (if the sensor 50 detects a parameter other than phase voltage) and develops a signal representing DC content in the inverter output which is supplied to a first input of a summer 72. The summer 72 subtracts a signal REF representing a desired DC content magnitude (in this case zero) from the signal developed by the low pass filter 68 and the resulting error signal is amplified by an amplifier 74. First and second circuits 76, 78 split the amplified error signal into a magnitude signal representing the magnitude of the DC content on a line 80 and a sign signal representing the sign or polarity of the DC content on a line 82. The signal on the line 80 is converted into a digital signal by an analog-to-digital converter 84 and is supplied to the second set of add/subtract inputs of the adder/subtractor 64. The sign signal on the line 82 is supplied to a control input of the adder/subtractor 64. The adder/subtractor 64 either adds or subtracts the digital word produced by the A/D converter 84 to or from the word developed at the output of the latch 62 in dependence upon the sign signal developed on the line 82.

Figure 4:
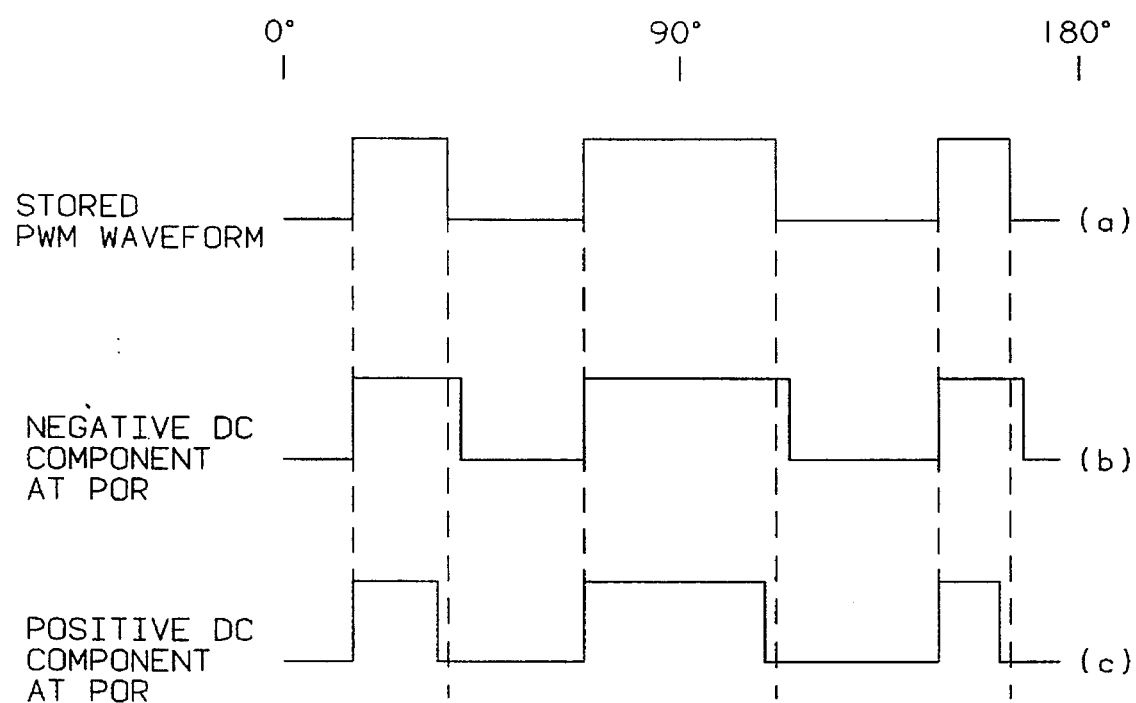
FIG. 4 comprises a set of waveform diagrams illustrating the operation of the circuit shown in FIG. 3.

According to alternative embodiments of the present invention, when the DC content in the inverter output is positive in polarity, the pulse widths in the first half-cycle of each control signal are decreased or narrowed and/or the pulse widths in the second half-cycle of each control signal are increased or widened so that negative DC content is introduced in the output to offset the positive DC content. The pulse widths are narrowed or widened, as required, by advancing or delaying rising and/or falling edges in the pulses. This is accomplished by the adder/subtractor 64 which subtracts the digital word developed by the analog-to-digital converter 84 from the output of the latch 62 when the signal on the line 82 indicates that positive DC content is present in the inverter output. As seen in waveform (c) of FIG. 4, this causes the pulses in the first 180° of each control signal to be narrowed while the pulses in the second half-cycle of each control signal are widened so that negative DC content is introduced into the inverter phase output waveforms to counteract the positive DC content.

Conversely, when negative DC content is present in the inverter output, as indicated by the signal on the line 82, the digital word developed at the output of the A/D converter 84 is added to the latched memory output as provided by the latch circuit 62 so that pulses in the first half-cycle of each control signal are widened while pulses in the second half-cycles of these waveforms are narrowed. Thus, a positive DC component is introduced in the inverter phase output waveforms to counteract the negative DC component.

The output of the adder/subtractor 64 is compared by the digital comparator 48 with the latched counter output as provided by the latch 46. When equality of these two words is detected, a pulse is provided back to the counter 62 which then accesses the next memory location in the EPROM 56. In addition, the output of the comparator 48 is latched by a flip-flop 86 and the latched output is provided to the base drive and isolation circuit 32a.

The latch 62 is controlled by a memory latch logic circuit 90 which is in turn responsive to a signal developed on a line 92 indicating that the latched output of the counter 44 is greater than the digital word developed at the output of the adder/subtractor 64. The circuit 90 is also responsive to a signal on a line 94 developed by a counter decoder 96.

The decoder 96 develops a high state signal when the output of the latch 46 reaches a certain value. In the preferred embodiment, the counter decoder 96 develops a high state pulse when a digital value equal to 8184 is latched by the latch 46, although the decoder might alternatively provide a high state output when a different number is provided at the output of the latch 46.

The counter decoder 96 generates a reset signal which resets the counters 44 and 60 to zero. This, in turn, causes generation of a new cycle of the inverter phase output. In addition, the memory latch logic circuit 90 causes the latch 62 to latch a new word at the output of the memory 56 when the comparator 48 detects equality at the inputs thereon or when the decoder 96 develops an end of cycle pulse.

From the foregoing it can be seen that the manner in which the PWM information is stored in the memory 56 permits ready implementation of the DC content control through the use of the adder/subtractor 64 and the circuitry 66.

As noted above, different embodiments are possible wherein pulse widths in only one half-cycle of each phase output waveform are widened or narrowed. Still further, the leading edge or the falling edge or both edges of each pulse may be shifted in time, or the width of one or more pulses in a half-cycle may be varied. In fact, it is possible to vary switching points for the pulses in the inverter output such that DC content is minimized and harmonic content is kept at an acceptable level.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A control for an inverter having a switch which is operated in accordance with a waveform having spaced rising and falling edges wherein the inverter produces AC output power, comprising:

means for detecting the magnitude and polarity of a DC component in the AC output power; and an adder/subtractor responsive to the detecting means for adjusting at least one of a rising and falling edge of the waveform to reduce the magnitude of the DC component.

2. The control of claim 1, wherein the detecting means comprises a summer which sums a signal representing the DC component with a reference to derive an error signal and an error amplifier coupled to the summer which amplifies the error signal.

3. The control of claim 2, wherein the adder/subtractor includes add/subtract inputs and a control input and wherein the detecting means further includes means for separating the amplified error signal into a magnitude signal which is coupled to the add/subtract inputs and a sign signal which is coupled to the control input.

4. The control of claim 3, wherein the add/subtract inputs further receive a series of digital words developed by a memory wherein each digital word represents intervals between rising and falling edges of a stored PWM waveform.

5. A control for a pulse-width modulated (PWM) inverter having a pair of switches which are alternately operated in accordance with a PWM control waveform having rising and falling edges to develop AC output power, comprising:

a memory having a series of digital words stored therein representing intervals between rising and falling edges of a stored PWM waveform;

means for detecting the magnitude and polarity of a DC component in the AC output power;

an adder/subtractor having a first set of add/subtract inputs coupled to the memory, a second set of add/subtract inputs which receive a signal representing the magnitude of the DC component, a control input which receives a signal representing the polarity of the DC component and an output at which a series of modified interval words are developed;

a counter which develops a counter output; and a comparator which compares each modified interval word against the counter output to produce the PWM control waveform;

wherein a rising or falling edge of the PWM control waveform is adjusted by the adder/subtractor relative to a corresponding rising or falling edge of the stored PWM waveform to reduce the magnitude of the DC component.

6. The control of claim 5, wherein the detecting means comprises a summer which sums a signal representing the DC component with a reference to derive an error signal and an error amplifier coupled to the summer which amplifies the error signal.

7. The control of claim 6, wherein the detecting means further includes means for separating the amplified error signal into a magnitude signal which is coupled to the second set of add/subtract inputs and a sign signal which is coupled to the control input.

8. A control for a pulse-width modulated (PWM) inverter having a pair of switches which are alternately operated in accordance with a PWM control waveform having rising and falling edges to develop AC output power, comprising:

a memory having a plurality of series of digital words stored therein wherein each series represents intervals between rising and falling edges of a stored PWM waveform;

means for detecting the magnitude and polarity of a DC component in the AC output power;

an adder/subtractor having a first set of add/subtract inputs coupled to the memory, a second set of add/subtract inputs which receive a signal representing the magnitude of the DC component, a control input which receives a signal representing the polarity of the DC component and an output at which a series of modified interval words are developed;

a counter which develops a counter output; and a comparator which compares each modified interval word against the counter output to produce the PWM control waveform;

wherein a rising or falling edge of the PWM control waveform is adjusted by the adder/subtractor relative to a corresponding rising or falling edge of the stored PWM waveform to reduce the magnitude of the DC component.

9. The control of claim 8, further including means for sensing a parameter of the AC output power and means for selecting one of the series of digital words from the memory in dependence upon the sensed parameter.

10. A method of controlling an inverter having a switch which is operated in accordance with a waveform having spaced rising and failing edges wherein the inverter produces AC output power, the method comprising the steps of:

detecting the magnitude and polarity of a DC component in the AC output power; and providing an adder/subtractor responsive to the detecting means for adjusting at least one of a rising and falling edge of the waveform to reduce the magnitude of the DC component.

11. The method of claim 10, further including the step of providing a memory which stores a series of digital words wherein each digital word represents intervals between rising and falling edges of a stored PWM waveform and wherein the adder/subtractor adds or subtracts a digital magnitude word representing the magnitude of the DC component to a digital word retrieved from the memory.

12. The control of claim 10, wherein the step of detecting includes the steps of summing a signal representing the DC component with a reference to derive an error signal and amplifying the error signal.

13. The control of claim 12, wherein the adder/subtractor includes add/subtract inputs and a control input and wherein the step of detecting further includes the step of separating the amplified error signal into a magnitude signal which is coupled to the add/subtract inputs and a sign signal which is coupled to the control input.

14. A method of controlling a pulse-width modulated (PWM) inverter having a pair of switches which are alternately operated in accordance with a PWM control waveform having rising and falling edges to develop AC output power, the method comprising the steps of:

providing a memory having a plurality of series of digital words stored therein wherein each series represents intervals between rising and falling edges of a stored PWM waveform;

detecting the magnitude and polarity of a DC component in the AC output power;

providing an adder/subtractor having a first set of add/subtract inputs coupled to the memory, a second set of add/subtract inputs which receive a signal representing the magnitude of the DC component, a control input which receives a signal representing the polarity of the DC component and an output at which a series of modified interval words are developed;

providing a counter which develops a counter output; and sequentially comparing each modified interval word against the counter output to produce the PWM control waveform;

wherein a rising or falling edge of the PWM control waveform is adjusted by the adder/subtractor relative to a corresponding rising or falling edge of the stored PWM waveform to reduce the magnitude of the DC component.

15. The control of claim 14, including the further steps of sensing a parameter of the AC output power and selecting one of the series of digital words from the memory in dependence upon the sensed parameter.

* * * * *